United States Patent
Khazanov

(10) Patent No.: US 7,071,588 B1
(45) Date of Patent: Jul. 4, 2006

(54) PUMP MOTOR PENETRATION ASSEMBLY

(75) Inventor: Yuri Khazanov, Northbrook, IL (US)

(73) Assignee: Yeomans Chicago Corporation, Aurora, IL (US)

( * ) Notice: Subject to any disclaimer, the term of this patent is extended or adjusted under 35 U.S.C. 154(b) by 0 days.

(21) Appl. No.: 11/132,785

(22) Filed: May 19, 2005

Related U.S. Application Data

(60) Provisional application No. 60/573,001, filed on May 20, 2004.

(51) Int. Cl.
*H02K 11/00* (2006.01)
*H01R 13/40* (2006.01)

(52) U.S. Cl. ............................ 310/71; 310/87; 439/587

(58) Field of Classification Search ................. 310/71, 310/87; 174/52.2, 65 R; 439/587
See application file for complete search history.

(56) References Cited

U.S. PATENT DOCUMENTS

| | | | |
|---|---|---|---|
| 223,835 A | 1/1880 | Boyle | |
| 2,260,542 A | 10/1941 | Shaffer | |
| 2,297,828 A * | 10/1942 | Flatford | 174/50 |
| 2,583,804 A * | 1/1952 | Andrus | 310/87 |
| 2,673,301 A | 3/1954 | Richter | |
| 2,703,371 A | 3/1955 | Wightman | |
| 3,501,737 A * | 3/1970 | Davy et al. | 439/584 |
| 3,830,955 A * | 8/1974 | Double | 174/65 R |
| 3,842,298 A * | 10/1974 | Schaefer | 310/87 |
| 4,053,196 A * | 10/1977 | Dunaway | 310/68 R |
| 4,309,568 A | 1/1982 | Isaksson | |
| 4,436,950 A | 3/1984 | Gaffal et al. | |
| 4,458,108 A | 7/1984 | Kashimoto et al. | |
| 4,599,487 A | 7/1986 | Blank et al. | |
| 4,626,721 A * | 12/1986 | Ouchi | 310/71 |
| 4,965,409 A | 10/1990 | Lindroos | |
| 5,642,892 A | 7/1997 | Burgess | |
| 5,704,799 A * | 1/1998 | Wood | 439/281 |
| 5,772,218 A | 6/1998 | Burgess | |
| 5,801,465 A * | 9/1998 | Yamada | 310/71 |
| 5,920,035 A | 7/1999 | Hancy et al. | |
| 6,020,661 A * | 2/2000 | Trago et al. | 310/43 |
| 6,262,370 B1 * | 7/2001 | Kreutz | 174/65 SS |
| 6,676,447 B1 | 1/2004 | Knox | |
| 6,899,531 B1 * | 5/2005 | Hummel | 417/407 |

* cited by examiner

*Primary Examiner*—Darren Schuberg
*Assistant Examiner*—Erik Preston

(57) ABSTRACT

A cable connector assembly used for connecting exterior electrical cables to a motor housing has a hollow cap member with an opening through which the cable extends. A compressible retainer is compressed within the cap, around the cable and is held in place by a pressure member, which is held in place in the cap with a clip. The hollow interior of the cap may be filled with a sealant such as an epoxy in order to provide secondary sealing against moisture in addition to the compression of the retainer around the cable.

16 Claims, 6 Drawing Sheets

PUMP MOTOR PENETRATION ASSEMBLY

REFERENCE TO RELATED APPLICATIONS

This application claims priority from prior U.S. Provisional Patent Application No. 60/573,001, filed May 20, 2004.

BACKGROUND OF THE INVENTION

The present invention relates generally to pump motors, and more particularly to cable connector assemblies that are used to provide a connection between exterior electrical cables and internal circuitry of the motor.

In the sewage treatment industry, pumps are used in many applications. Some applications are "dry", meaning that the pump is not submerged in the liquid it is pumping, while other applications are "wet", meaning that all or a large portion of the pump and its motor are submerged. These pumps are driven by electrical motors powered by electricity. Cables must be run to the motors to provide electrical power to the motors, and these cables are usually passed through an opening in the pump or motor housing. The opening has a cap or cover member that closes the opening and the cables also pass through an opening in the cap. It is important to provide an effective seal between the cables and the cap in order to prevent liquid from entering the interior of the motor, either under pressure or by wicking through the cable.

The pump industry commonly utilizes two different designs for such cable connectors. In one design, the interior space of the cap is "potted", meaning it is filled with epoxy or some other sealant and in another design, rubber or flexible grommets are compressed to form a seal around the cables in the cap. Both designs have their problems. In the former design, a large amount of epoxy is used and this increases the cost of the connector assembly. Such a design is not suitable for repair in the actual operating environment of the motor, for all of the epoxy needs to be removed form the interior space of the cap. In the latter design, one or more rubber grommets, or bushings, are used to both seal the cables and retain the cables in place by applying pressure on the exterior of the cables. Such an assembly needs to be assembled each time the cable is connected to the motor. This is time-consuming and increases the labor cost of this design, and this exposure of the cable makes it susceptible to damage One embodiment of the present invention is directed to a cable housing-connector assembly that overcomes the aforementioned disadvantages Pump motors may be cooled in a variety of different ways. One way that is used for cooling a pump motor involves the use of a cooling liquid being pumped to cool the pump motor. This is accomplished by manufacturing a torturous path in the sidewalls of a motor casing to create many fluid cooling channels. This is expensive and sediments and other particulates in the pumped fluid may accumulate in the cooling channels and clog them to the point where the flow of cooling liquid is stopped in some areas, thereby resulting in localized hot spots. Servicing such a motor construction requires that the motor be removed from service and brought to a repair facility.

Another motor cooling construction involves mounting a fan or blower above the motor so that it forces air down and across the motor. This construction has a lower reliability because it requires a separate blower motor and the blower motor needs servicing if the pump area becomes flooded and the blower motor becomes flooded. For explosion-proof reliability the blower motor must also be made explosion-proof.

Yet another manner of motor cooling, that is used often in the field of dry-pit pumping, is one in which the cooling fan is connected to and above the motor shaft. Some problems are inherent in this design in that the interconnection between the blower fan and the motor creates a potential point of leakage, and the motor must be stopped when the motor becomes flooded in order to protect both the motor and the fan.

Another embodiment of the present invention presents a solution to the aforementioned problems in the form of a motor construction where the fan is coupled to the motor shaft in a manner that substantially eliminates the need for concern over leaks and in a manner that stops rotation of the fan when the motor is flooded without placing a large drive load on the motor.

SUMMARY OF THE INVENTION

Accordingly, it is a general object of the present invention to provide an improved cable cap design for use with a submersible motor that has a minimum of parts and which provides reliable sealing against fluids.

Another object of the present invention is to provide a cable cap assembly that is inexpensive to manufacture and which may be easily serviced in the field with a minimum of labor cost.

Yet another object of the present invention is to provide a cable cap assembly that may be used as a cable connector in which the cable cap assembly utilizes a hollow cap body having an opening through which the cable extends, a resilient retainer that fits within the cap, the retainer being sized to grip the exterior of the cable with a gripping force sufficient to provide a seal around the cable, a pressure element in the form of a sleeve that fits within the cap and which contacts the retainer and exerts a pressure thereon to hold the retainer in place within the cap, and a clip member that defines an interior shoulder of the cap against which the pressure sleeve abuts, the clip member holding the pressure member in place in the cap.

Still another object of the present invention is to provide a cable connector assembly having a retainer that is received within a hollow receptacle portion of a cap, and a pressure sleeve that bears against the retainer to hold it in place, the cap having a flange with openings formed therein, the flange defining a reaction surfaces against which a tool may be applied to urge the pressure member into the cap against the retainer.

Yet still a further object of the present invention is to provide a cable cap assembly that includes a hollow cap with an opening through which a cable may pass, a resilient retainer received within the hollow cap which grips the exterior of the cable passing through the cap opening, and a pressure sleeve received within the cap and held in pressure contact against the retainer by a clip member, a portion of the hollow interior of the cap along the length of the pressure sleeve being filled with a sealant in order to provide a barrier against moisture entering into the motor housing along the exterior surface of the cable, the pressure sleeve being removable from the cap in manner such that the pressure sleeve and sealant may be removed in substantially a single action, thereby eliminating the need to fully clean the interior of the cap when repair of the assembly is required in the field.

Yet still another object of the present invention and as exemplified by another embodiment thereof, is to provide a releasable coupling between a motor and a cooling fan, utilizing a magnetic coupling that is interposed between the motor shaft and the fan shaft, whereby the magnetic coupling transmits rotation between the motor shaft and the fan shaft at selected speeds and loads and disengages at other selected speeds and loads.

These and other objects and advantages of the present invention are accomplished by way of the structure of the present invention.

In one principal aspect of the present invention and as encompassed one embodiment thereof, a waterproof cable cap assembly is provided in the form of a hollow cap that may be bolted to the motor housing. The cap preferably includes a mounting flange with two or more bolt holes formed therein. The cap has a hollow interior and an opening at its top that permits a cable to be passed through the cap. A resilient retainer, typically in the form of a rubber or elastomeric bushing, or grommet, is placed around the exterior of the cable and then disposed within the interior of the cap. The retainer may have washers attached to opposing surfaces thereof so that a compression force may be applied to the retainer. The retainer has a central opening through which a cable is passed and when the grommet is compressed, it grips the exterior surface of the cable, thereby providing a seal against the cable.

A pressure member is preferably provided that fits within the cap interior and the pressure member contacts the grommet and one of its washers. The pressure member preferably takes the form of an annular sleeve with a central opening through which the cable may pass, and the sleeve is slid into the cap interior and pushed into contact against the retainer. The cap also may include an inner groove which receives a clip member that therein. The clip member may take the form of a retaining ring or C-clip and it is preferably located at a predetermined distance from the cap opening so that it serves to define a reaction surface to hold the pressure sleeve in place against the retainer and thereby apply a reliable compression force to the retainer.

In another embodiment, the hollow interior portion of the cap may be filled or potted with a sealant, such as an epoxy. This sealant fills most of the interior space within the cap up to a level just below the near end of the pressure sleeve, in order to provide a seal against moisture wicking in from outside the motor. Because the sealant extends lengthwise of the pressure sleeve, when the cap or motor needs to be repaired in the field, the sealant and pressure sleeve may be removed as substantially a single unit.

In another principal aspect of the present invention, an improved cooling system for a pump motor is provided by utilizing a cooling fan that is mounted above the motor so as to direct air across and through the motor casing during operation of the motor. The fan may be mounted to its own shaft and further attached to a releaseable coupling, preferably a magnetic coupling that selectively engages the motor shaft. When a magnetic coupling is used, the strength of the magnetic force is chosen so that the coupling will disengage the motor shaft at certain loads of increases in torque on the fan, such as what will occur if the motor becomes flooded.

These and other objects, features and advantages of the present invention will be clearly understood through a consideration of the following detailed description.

DETAILED DESCRIPTION OF THE PREFERRED EMBODIMENTS

Figure 1:
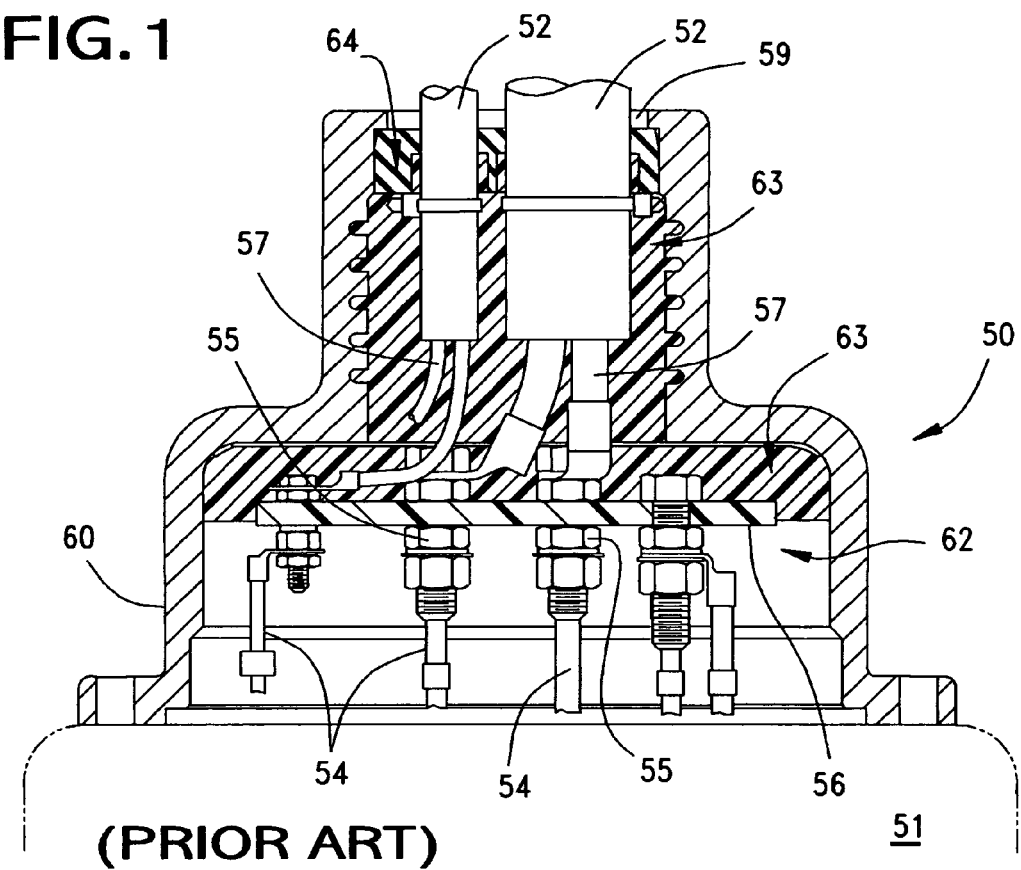
FIG. 1 is a sectional view of a conventional pump housing cap having an interior cavity filled with a potting compound and that is used to connect exterior electrical cables to internal circuitry of the pump motor.

FIG. 1 is a cross-sectional view of a known cable cap assembly 50 that is used to connect one or more electrical cables 52 to circuitry in a motor 51 (shown in phantom). Such a connector assembly is typically used for submersible motors, such as motors that are used to power waste pumps in the water treatment, supply and chemical industries. Because the pumps and motors are usually submerged in the fluid which is being pumped, care must be taken to ensure that the liquid does not enter the interior of the motor housing through cable passages where the liquid can subsequently contact motor circuitry and cause electrical shorts.

The cap assembly 50 typically includes a cap, or cover member, 60 that is bolted over an opening, or penetration (not shown) in the outer housing of the motor 51. In the construction illustrated, internal cables 54 may be terminated to contacts 55 that are supported on a plate 56 and the exterior cables 52 are cut to expose their inner wires 57, which are in turn terminated to the contacts 55. The hollow inner receptacle portion 62 is filled, or "potted" with a sealant 63, such as an epoxy, and one or more seal members 64 may be provided near the entrance opening 59 of the cap 60. The seal members typically include elastomeric or rubber bushings. Such a connector construction relies upon the sealant to provide both a moisture seal as well as retaining the cables in place within the cap. The sealant is used to prevent moisture from wicking into the motor housing along the exterior of the cables. The large volume of epoxy that is used as a sealant makes this type of construction expensive in that all of the cavities in the upper portion of the hollow inner portion 62 of the cap must be completely filled. Such a construction is not suited for repair in the field, i.e., at the site of the motor, and thus the entire cap and cable assembly may have to be removed and sent to a repair facility.

Figure 2:
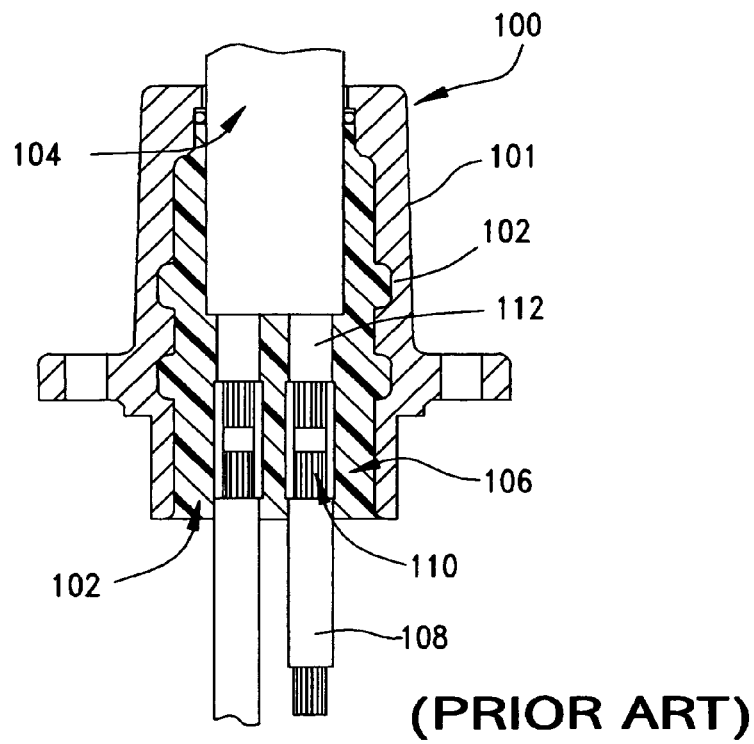
FIG. 2 is a sectional view of another conventional cable cap assembly, smaller in size than that of FIG. 1, and which is used to connect electrical cables to internal circuitry of a pump motor, and with an internal cavity that is filled with a potting compound.

FIG. 2 illustrates another known cap connector assembly 100 that has a smaller volume cap 101 with an inner hollow receptacle portion 102 that receives an electrical cable 104 therein. This type of construction is utilized primarily with individual cables and also relies upon a large volume of sealant 106 that is disposed in its receptacle portion 102 to provide both sealing and retention of the cables 104. The internal motor wires 108 may be spliced, at 110, to the wires 112 of the cable 104. In this construction, the smaller epoxy volume makes the potting of the connector easier and the cost is reduced because of the smaller volume and wire splices 10. Such a construction is easy to stock and to replace the entire connector assembly on site in the field, but the construction is not field repair-friendly in that the epoxy must be dug out of the cap and the splices replaced along with a new volume of epoxy. The internal cavity of the cap 01 may have annular grooves formed in it to assist in retaining the epoxy. In repair, the epoxy must be scraped out of these grooves so that new epoxy will engage all of the inner surfaces of the cap 101.

Figure 3:
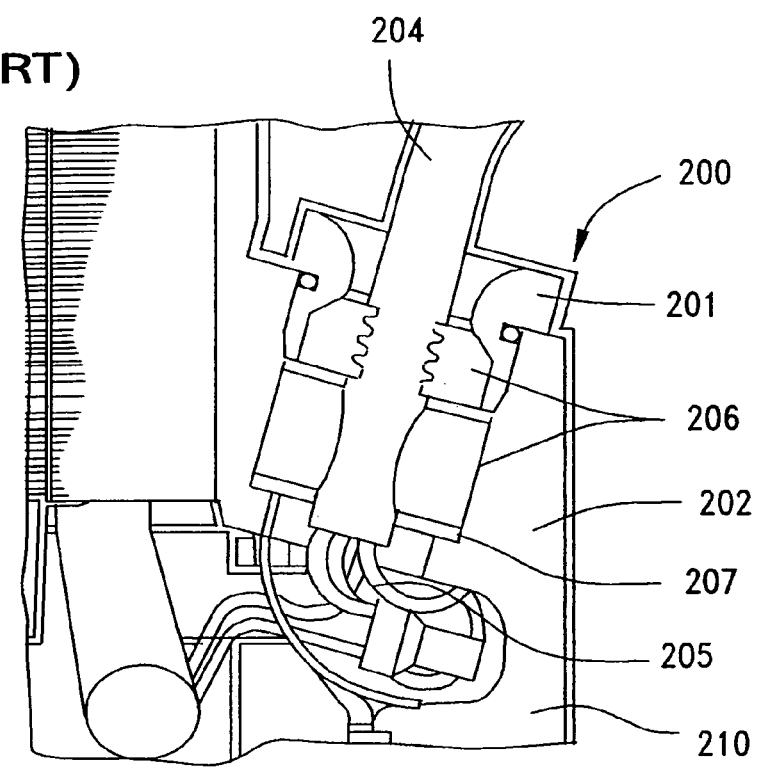
FIG. 3 is a sectional view of a third conventional cable cap assembly that is used to connect exterior electrical cables to internal circuitry of a pump motor and which uses a plurality of seal members to effect a seal around the entrance of an electrical cable into a motor housing.
Figure 4:
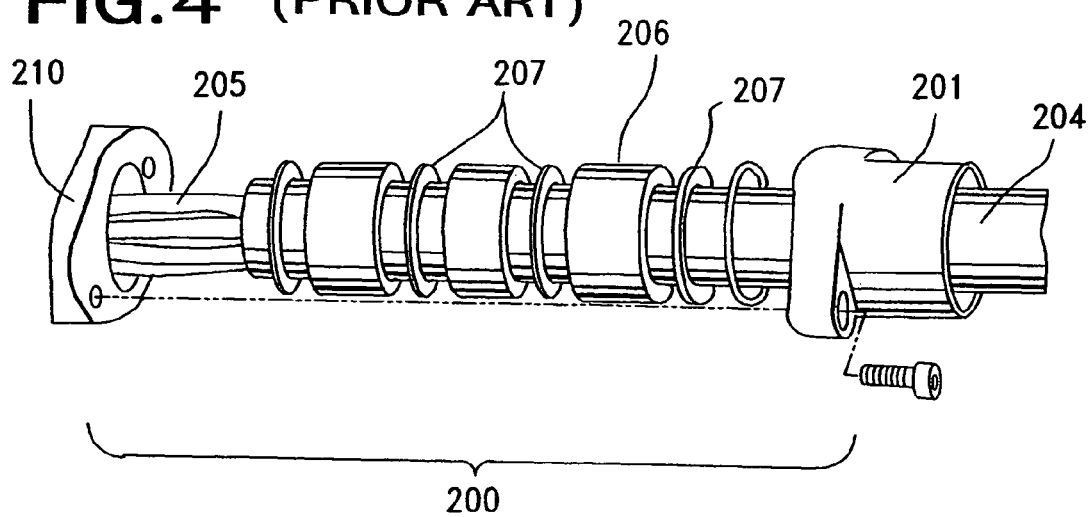
FIG. 4 is an exploded view of portions of the cable cap assembly of FIG. 3.

FIGS. 3 & 4 illustrate yet another known cable cap assembly 200 in which an electrical cable 204 is passed through the opening of a cap 201 and the wires 205 of the cable are terminated within the motor housing 210 to circuitry. In this construction, one or more resilient retainers 206 are used and are applied over the cable 204, such retainers may be made from rubber of similar resilient elastomeric material, and one or more washers 207 are applied to opposing surfaces of the retainer 206 to present a flat and preferably metal bearing surface. In this construction, the cap 201 is bolted to the motor housing 210 and the bolting applies a compressive force to the retainer(s) 206 and compresses the retainer(s). This compression forces the retainer to expand radially and grip both the exterior surface of the cable 204 and the interior surface of the opening in the motor housing. This type of construction relies upon the retainers to provide both sealing and retention of the cable. Wicking of moisture from the exterior into the motor housing is prevented by the retainer squeezing the exterior surface of the cable. The many retainers and washers need to be assembled each time the cable is connected to the motor and thus increase the labor factor in the motor assembly, even though it may be assembled in the field. The use of multiple parts increases the risk that the cable may be damaged during assembly. Also, if a retainer is damaged during installation, such as nicked, it may create a path for moisture to travel into the interior of the motor housing.

Figure 5:
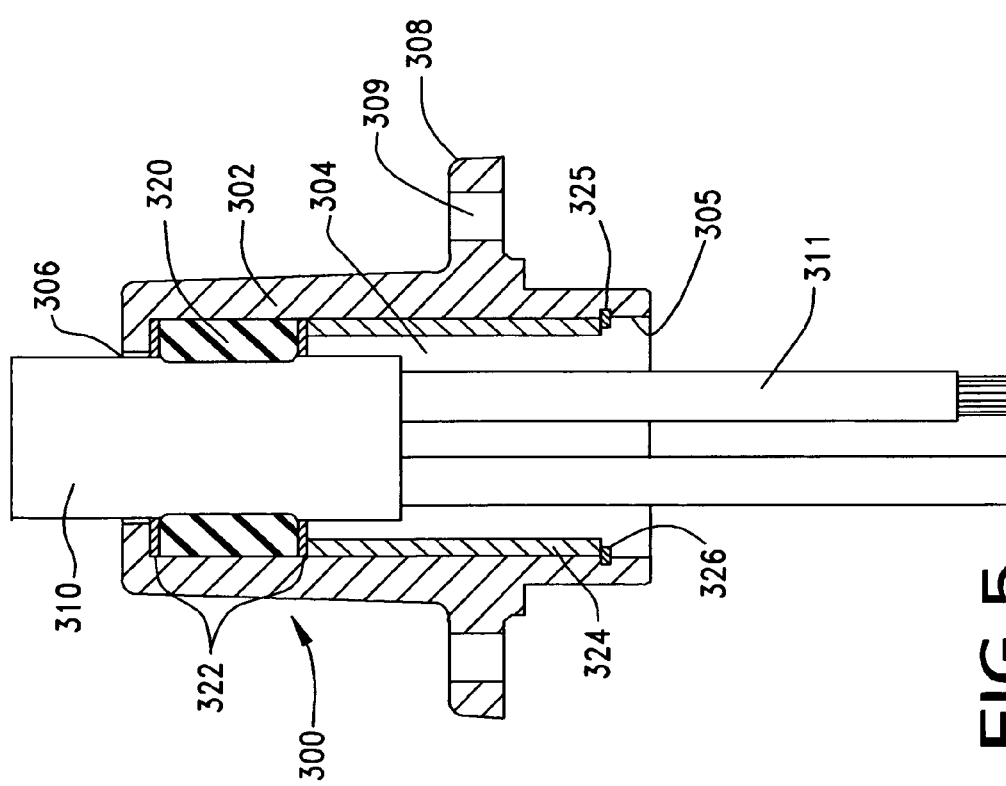
FIG. 5 is a sectional view of one embodiment of a cable cap assembly of the present invention and which includes a hollow interior cavity unfilled by any sealant material.

The present invention is directed to an improved cable connector construction which avoids the aforementioned shortcoming of known cable connectors and assemblies. FIG. 5 is a sectional view of one embodiment of a cable cap assembly 300 constructed in accordance with the principles of the present invention and is illustrated as being utilized in a single cable application. A cable cap 302 is provided with a hollow interior portion 304 with an opening, or penetration 306, at one end thereof and a mounting flange 308 preferably formed therewith at the other end. The mounting flange 308 may include one or more bolt holes 309 so that the cap 302 may be bolted into place on a motor housing (not shown). A cable 310 extends through the cap opening 306 and through the interior portion 304 where its inner wires 311 are exposed for termination to motor circuitry.

A compressible retainer 320 is provided having an outer diameter that preferable matches that of the cap inner portion (or which is slightly larger) and the cap 302 may be conical in nature so that when the retainer 320 is moved into the inner portion 304, the cap may assist in compression of the retainer 320. Two washers 322, preferably in the form of flat metal rings, such as washers, are provided on opposing sides of the retainer 320. As will be understood, these flat members 322 assist in the compression of the retainer 320 by providing positive, flat and hard bearing surfaces against which a force may be applied. The retainer serves to prevent fluid from entering the motor housing along the cable exterior under exterior pressure.

A pressure member 324 is provided in order to force the retainer 320 into the cap inner portion 304 and such a member is illustrated in FIG. 5 as a hollow, cylindrical or tapered sleeve that is received within the inner portion 304 along the inner surface 305 of the cap and which may be moved within the cap inner portion 304 in the direction of the cap opening 306. The sleeve 324 has two opposing ends, a near end, shown as 324a and a far end, shown as 324b, and the sleeve preferably has the same configuration as its associated cap 302. The sleeve 324 is also preferably configured to be complementary in configuration so that if the interior cavity of the cap member is tapered, then so is the sleeve. Likewise for a cap member with a cylindrical shape. Furthermore, the pressure sleeve 324 preferably has a slidable fit within the interior of the cap member.

The cap 302 is preferably provided with a means for holding the pressure member 324 in place and such means are shown in FIG. 5 as an interior groove 325, that preferably extends around the entire circumference of the inner surface of the cap inner portion 304 and a clip member 325. This interior groove 325 receives a clip member 326 that may take the form of a retaining ring, C-clip, snap ring or the like and it serves to hold the pressure member 324 in abutting contact with the near washer 322 so as to exert a compressive force on the retainer 320 between the near washer 322 and the far washer 322 that abuts the inner surface of the cap inner portion 304 proximate to the cap opening 306.

Figure 6:
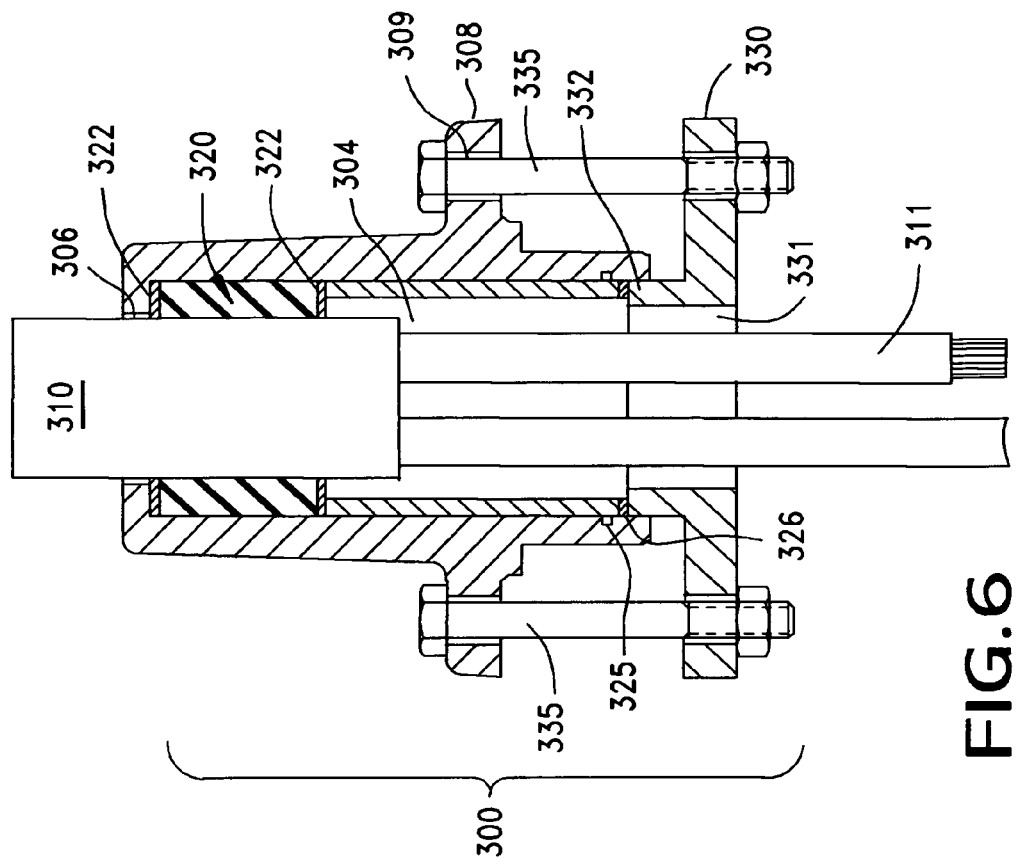
FIG. 6 is a sectional view of the cable cap assembly of FIG. 5, that is attached to an installation tool which is used to compress the internal retainer bushing of the assembly against the exterior of the cable and which is used to install the pressure sleeve in the cap housing member.

As shown best in FIG. 6, this construction permits the use of a simple tool for installation. Such a tool may include a flange member 330 with an opening 331 through which the cable wires may pass and with an interior rim 332 having a diameter that is preferably smaller than that of the cap inner portion 304 so that the rim 332 of the flange 330 may be advanced within the cap inner portion 304. The rim 332 of the flange 330 may include a flat bearing surface 334 that engages the snap ring 326 and advances it and the pressure sleeve 324 that the snap ring 326 sits against and both the snap ring and pressure sleeve are easily advanced within the cap by tightening the bolts 335. This tool permits the snap ring 326 and pressure sleeve 324 to be advanced evenly in a longitudinal direction within the cap. When properly-tightened, the snap ring 326 enters the groove 325 and the pressure sleeve 324 is then locked in place against the retainer 320 by way of its contact with the near washer 322. The tool can be used to ensure uniform compression of the retainer and advancement of the snap ring.

Disassembly of the cable cap assembly is easily accomplished by using a conventional pair of snap ring pliers in instances where a snap ring is used to remove the snap ring. The cable may be cut outside of the pressure sleeve 324 in the area of the top of FIG. 5. The pressure sleeve 324 may then be withdrawn with the cable stub. Removal of the pressure sleeve 324 will remove the compressive force on the retainer 320, so that it may be pulled out of the cap member internal cavity with the epoxy and the pressure sleeve 324 as substantially one piece. The potting epoxy tends to be pulled out substantially entirely as one piece with the pressure sleeve, and this virtually eliminates the amount of labor needed to scrape the epoxy out of the cap member. The pressure sleeve 324 therefore serves as a sacrificial container that may be replaced and can be used either with the epoxy or without it.

This type of construction is best suited for applications where the wires 311 are directly terminated to a terminal block or other contact arrangement in the motor housing. The prevention of moisture penetration is accomplished by the squeeze, or compression, of the retainer against the exterior surface of the cable 310 and the extent of compression is controlled by the length of the pressure member. The components of the invention are easy to stock and are well-suited for inexpensive assembly and repair in the field. As will become evident below, the pressure sleeve 324 importantly creates a specific annular interior space in the cap that surrounds the cable wires.

Figure 7:
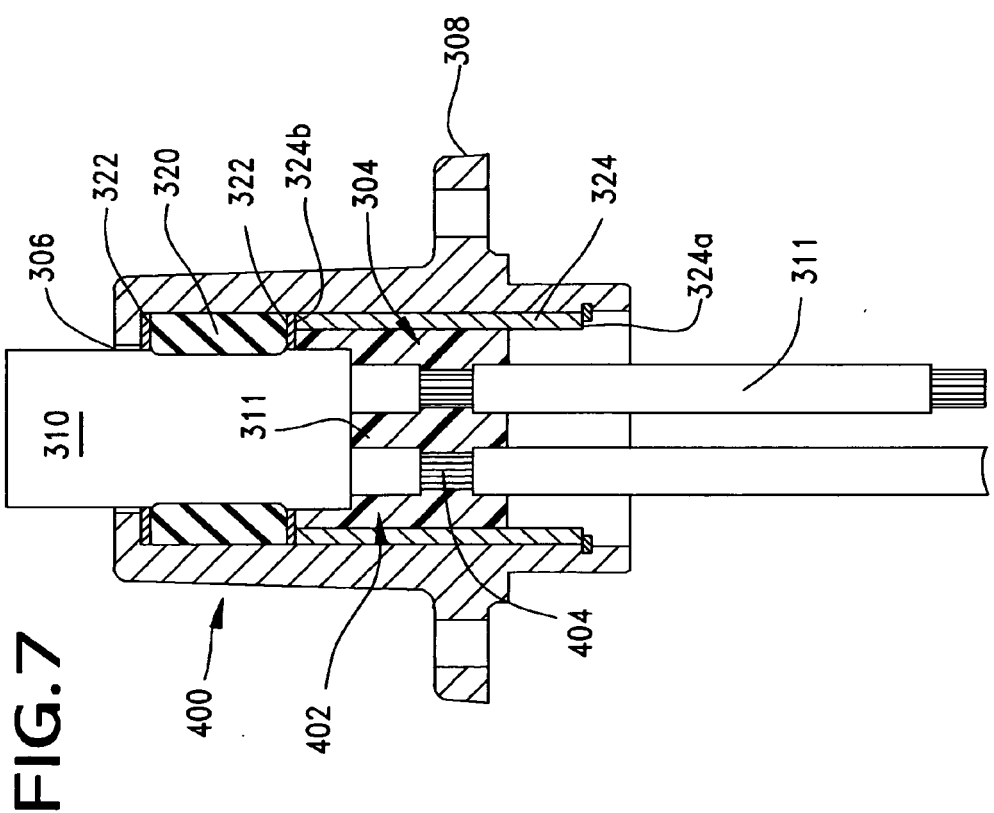
FIG. 7 is a sectional view of another embodiment of a cable cap assembly constructed in accordance with the principles of the present invention and similar in structure to that shown in FIG. 5, but wherein the internal cavity of the cap assembly is filled with a sealant to a level beneath the near edge of the pressure sleeve.

FIG. 7 illustrates another embodiment of a cable connector assembly 400 in which the components are the same as those used in the embodiment of FIGS. 5 & 6, but the hollow interior portion 304 is filled with a selected volume of sealant 402. A stated above, the sealant is preferably a curable sealant such as a two-part epoxy or the like with a viscosity sufficient to permit it to be injected either under pressure or by way of a hand tube. The sealant need not fil the entire volume of the hollow interior but it should preferably extend over any splices 404 that may be utilized, and preferably, it should extend to a level just within (or beneath) the near end 324a of the pressure sleeve 324 so that contact between the sealant and the interior surfaces of the cap member is prevented. This sealant seals the cables and their jackets from any moisture entering in from the exterior along the cable exterior jackets because it not only adheres to the interior surface of the pressure sleeve 324, but also to the open end 311 of the cable 310 from which the wires 311 project. Such a construction meets the specifications for both retainer and potted sealant connector assemblies. It is easy to assemble in the field with a conventional sealant. Such a construction further prevents liquid entering if the cable jacket is punctured or otherwise compromised.

Figure 8:
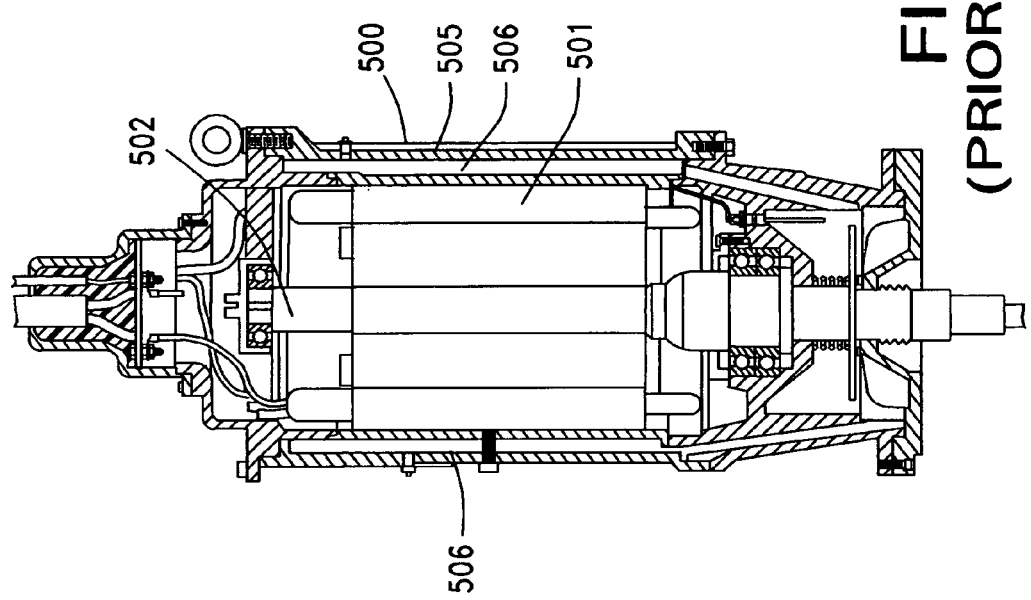
FIG. 8 is a sectional view of a conventional dry pit motor with a specially configured exterior motor housing with cooling channels formed therein which provide cooling channels for a liquid to cool the motor housing.

FIG. 8 illustrates in section, a conventional liquid cooled pump motor 500 that encloses a motor 501 mounted around a shaft 502. The motor has a specially configured housing 505 with a plurality of cooling channels 506 formed therein through which pumped fluid circulates in order to cool the motor during operation. Such a construction has certain limitations because the cooling depends upon heat transfer from the motor to the pumped cooling fluid. The motor housing is a complex design that requires expensive castings of an external jacket, both of which add significantly to the cost of the motor. Servicing of such a motor must be done by a repair facility that if familiar with the cooling technology employed. The heat transfer channels in the motor housing also make this type of motor expensive because the pump-motor mounting interface is complicated.

Figure 9:
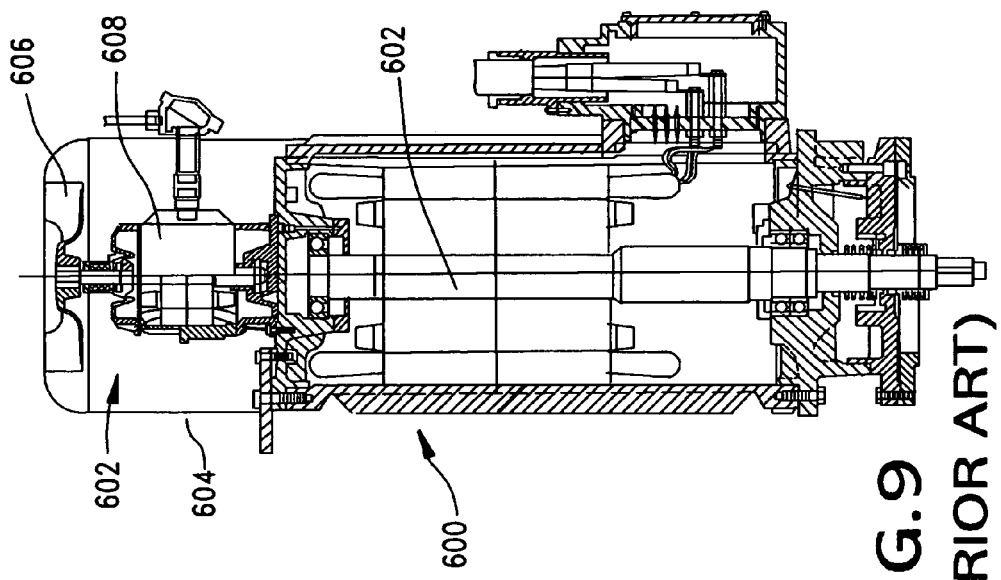
FIG. 9 is a sectional view of a conventional motor that uses a separate cooling fan and motor assembly above the motor to provide air cooling for the motor.

FIG. 9 illustrates a known motor 600 that utilizes a cooling fan assembly 602 that is mounted above the motor shaft 603. The cooling fan 606 of the assembly is powered by its own motor 608, which is mounted in a compartment or housing 604 that is mounted to the motor housing. These type motors as are the ones in FIG. 8, are commonly used in dry pit applications, where the motors sit out in open air and pump for a pit that fills upon demand. In some instances where the fluid demand is excessive the dry pit may consequently flood, and in such an instance the blower motor would need to be serviced after being flooded.

Figure 10:
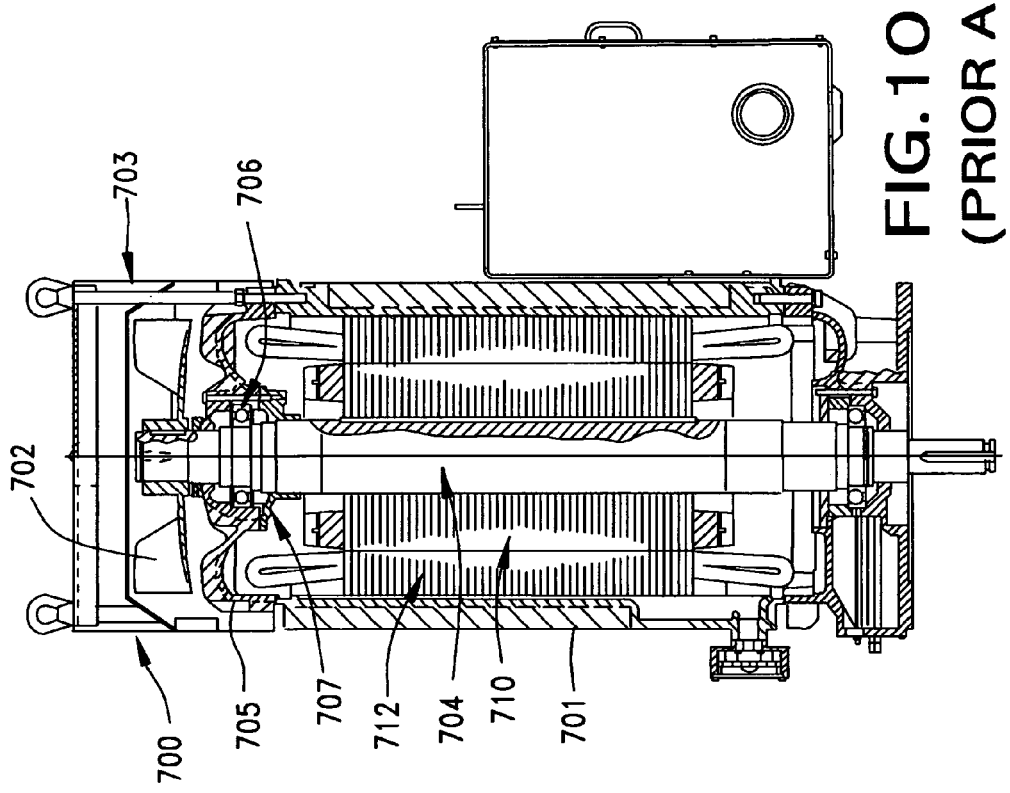
FIG. 10 is a sectional view of a conventional TEFC style motor which utilizes a cooling fan that is directly attached to the motor shaft and positioned above the motor housing to provide a flow of air thereover to cool the motor; and, FIG. 11 is a sectional view of a cooling assembly constructed in accordance with the principles of the present invention in which a releaseable coupling means, shown as a magnetic coupling is utilized to interconnect a cooling fan with a motor shaft.

FIG. 10 illustrates a TEFC motor 700 that utilizes a fan 702 that is held within a fan cover 703, and the fan 702 mounted directly to the motor shaft 704 at a location above a motor upper bracket 705 so that rotation of the motor shaft rotates the fan 702 and a positive air flow is created over the motor. The motor shaft 704 supports a rotor 710 that rotates within a fixed stator 712. The upper bracket 705 may cooperate with an upper bearing cap 707 to hold in place the motor upper bearing 706. However, the location where the motor shaft 704 protrudes from the motor housing 701 creates a potential leakage area for moisture. In instances where the dry pit becomes flooded, the motor 700 must be stopped so that both the motor 700 and the fan 702 are not damaged. The fans 702 of these type motors are typically designed for propelling-air and not fluid. If the fan 702 contacts an propels a liquid fluid, it increases the rotational load on the motor 700, leading to the likelihood of motor burnout.

Figure 11:
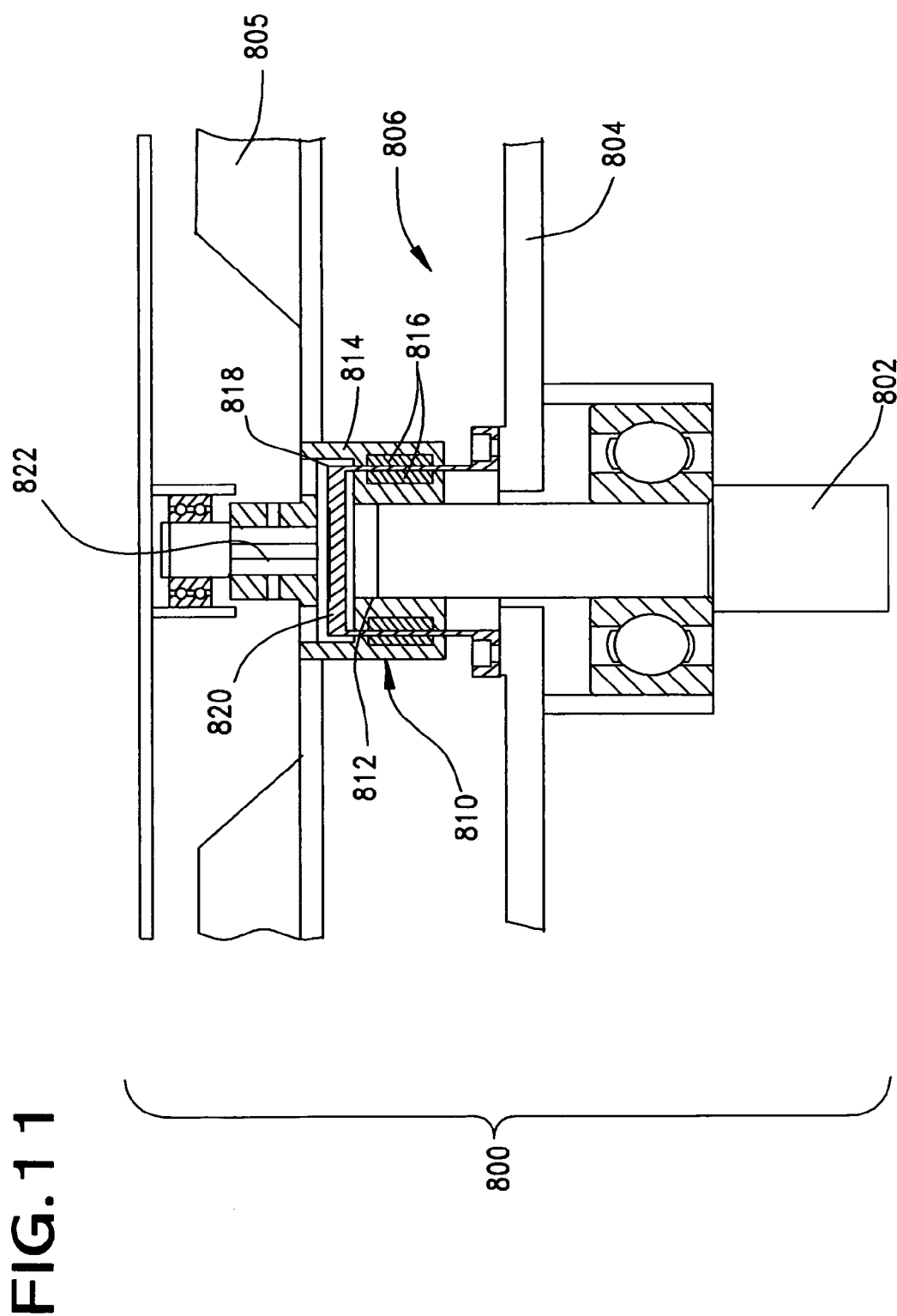

FIG. 11 is a schematic view of an improved cooling fan assembly 800 constructed in accordance with the principles of the present invention. The motor shaft 802 projects upwardly through the motor housing 804 and the cooling fan 805 is positioned above it within an extension of the motor housing or a separate compartment 806. A magnetic coupling 810 is provided to interconnect the cooling fan 805 to the motor shaft 802. The magnetic coupling preferably includes two parts, an inner rotor 812 that is mounted to the motor shaft so as to rotate with the motor shaft 802, and an outer rotor 814, which is affixed to the fan 805 so that it rotates concurrently with the fan 805 during operation. Other constructions may be utilized. Each of the two rotor elements 812, 814 s preferably contain one or more magnets 816 that have a selected magnetic force chosen for the specific pump application. The inner rotor 812 may be contained within an outer shroud 818 that extends over an inner shroud 820 and serves as a cover to the coupling with respect to the motor shaft end. The outer rotor may have a shaft 822 operatively connected thereto which engages the fan 805. The arrangement of the magnets may be linear, meaning that the magnets may extend vertically within the coupling rotor elements, or they may be circular inserts that form part of the coupling rotor element inner and outer surfaces. Any pattern will suffice provided that is has enough surface area exposed in the coupling to effectively operate.

In this type of arrangement, the cooling fan 805 is driven directly by the motor shaft 802 and rotation of the motor shaft 802 is directly transmitted to the cooling fan 805 through the magnetic coupling 810 so that there is no mechanical leak point in the motor construction. Any useful style of seal may be used at the point where the motor shaft extends out from the motor housing 804. Should the motor flood, the liquid will increase the rotational load on the motor shaft 802 by way of the cooling fan 805, but the magnetic force on the coupling 810 is set for a value that when reached, the rotational load, or torque of the motor shaft will exceed the magnetic force so that the cooling fan 805 will stop rotating, thereby decreasing the load on the motor. Once the motor stops, the magnetic force causes the coupling 810 to again engage the motor shaft 802. When flooded, the motor can continue to run because it is cooled by the flooding liquid. When the liquid subsides, the fan engages the motor shaft again and rotates concurrently with it to provides the necessary cooling.

While the preferred embodiments of the inventions have been shown and described, it will be apparent to those skilled in the art that changes and modifications may be made therein without departing from the spirit of the inventions, the scope of which is defined by the appended claims

The invention claimed is:

1. A cable cap assembly for attaching an electrical cable to a submersible motor housing at an opening formed in the motor housing, the assembly comprising:
   a cap member adapted to fit over the motor housing opening, the cap member having a body portion with two opposing ends, the body portion having an hollow interior that extends between the two ends of said cap member, one of said cap member ends including a mounting flange for mounting to said motor housing and the other of said cap member ends including an opening for an electrical cable to pass through, and said body portion including an interior groove formed therein near said cap member one end, and a clip member that fits into the body portion interior groove;
   a resilient compressible retainer including an opening formed therein through which the electrical cable may be passed, a pair of shoulder members disposed at opposing ends of the retainer; and,
   a removeable annular pressure member that is received within said cap body portion interior, the pressure member including a body portion whose configuration is complementary to said cap body interior, the body portion having two opposing ends, a first of the pressure member ends contacting one of said retainer shoulder members, and a second end of said pressure member contacting the clip member in a manner that applies a compression force to said retainer to urge said retainer into sealing contact with said cable.

2. The cable cap assembly of claim 1, wherein said pressure member includes a hollow sleeve, and wherein said pressure member urges one of said shoulder members against said cap member other end.

3. The cable cap assembly of claim 2, wherein said sleeve is cylindrical.

4. The cable cap assembly of claim 2, wherein said sleeve is tapered along its length.

5. The cable cap assembly of claim 2, wherein said sleeve has an outer diameter is slightly less than an inner diameter of said cap member interior.

6. The cable connector assembly of claim 1, wherein said pressure member defines a hollow annular cavity surrounding said cable and said cavity is filled with a curable sealant.

7. The cable cap assembly of claim 6, wherein the sealant covers an open end of said cable, said one shoulder member and at least a portion of an interior of said pressure member.

8. The cable cap assembly of claim 6, wherein said cavity is filled with said sealant to a level close to said pressure member second end so that said sealant does not contact said clip member.

9. A cable penetration cover assembly for attaching an electrical cable to a submersible motor housing at an opening formed in the motor housing and sealing the opening, the assembly comprising:
   a cap member adapted to mate with the motor housing opening, the cap member having a hollow body portion with first and second opposing ends, the body portion including an internal cavity that extends between the first and second ends of said cap member, the first end including a mounting flange for mounting to said motor housing and the second end including an opening for an electrical cable to pass through;
   a resilient compressible retainer held in the body portion internal cavity, the retainer including an opening formed therein through which the electrical cable may be passed, and first and second washer members being disposed within said body portion internal cavity at opposing ends of said retainer, the first washer being captured between said retainer and said cap member second end;
   an annular pressure sleeve disposed in said cap body portion interior, the pressure sleeve having an outer surface that lies adjacent to an inner surface of said cap member internal cavity, said pressure sleeve having opposing first and second ends, the retainer second washer being captured between said retainer and the pressure sleeve first end such that said pressure sleeve first end contacts said retainer second washer, said pressure sleeve being removable from said cap member, said pressure sleeve being hollow and defining a hollow annular cavity within said body portion internal cavity surrounding said cable;
   a retaining ring held within said cap member internal cavity in contact with the pressure sleeve second end to thereby force said pressure sleeve first end into bearing contact against said retainer second washer to thereby apply a predetermined compression force to said retainer to urge said retainer into sealing contact with said cable.

10. The cable cover of claim 9, wherein said pressure sleeve has a configuration that is complementary to said cap member internal cavity.

11. The cable cover of claim 9, wherein said pressure sleeve is cylindrical.

12. The cable cover of claim 9, wherein said pressure sleeve is tapered.

13. The cable cover of claim 9, wherein said pressure sleeve a hollow annular cavity is filled with a curable sealant.

14. The cable cover of claim 13, wherein said cap member internal cavity is filled with a sealant to a level close to said pressure sleeve second end so that said sealant does not contact said retaining ring.

15. The cable cover of claim 13, wherein the sealant covers an open end of said cable, at least a portion of said second washer and at least a portion of an interior of said pressure sleeve.

16. A cable penetration cover assembly for attaching an electrical cable to a submersible motor housing at an opening formed in the motor housing and sealing the opening, the assembly comprising:
   a cap member adapted to mate with the motor housing opening, the cap member having a hollow body portion with first and second opposing ends, the body portion including an internal cavity extending between the first and second ends of said cap member, the first end including a mounting flange for mounting to said motor housing and the second end including an opening for an electrical cable to pass through;

a resilient compressible retainer held in the body portion internal cavity proximate said cap member second end, the retainer including an opening formed therein through which the electrical cable may be passed, and first and second washer members being disposed within said body portion internal cavity at opposing ends of said retainer, the first washer being captured between said retainer and said cap member second end;

a removeable annular pressure sleeve disposed in said cap body portion interior, the pressure sleeve having an outer surface that lies adjacent to an inner surface of said cap member internal cavity, said pressure sleeve having opposing first and second ends, the retainer second washer being captured between said retainer and the pressure sleeve first end such that said pressure sleeve first end contacts said retainer second washer, said pressure sleeve being slidably received within cap member internal cavity;

a retaining ring held within said cap member internal cavity in contact with the pressure sleeve second end to thereby force said pressure sleeve first end into bearing contact against said retainer second washer to thereby apply a predetermined compression force to said retainer to urge said retainer into sealing contact with said cable; and, a curable sealant disposed within said pressure sleeve and occupying a portion of said cap member internal cavity from said pressure sleeve first end to a location proximate to said pressure sleeve second end, such that the sealant, when cured, may be removed from said cap member internal cavity, as a unit, with said pressure sleeve.

* * * * *